United States Patent
Rapthel et al.

(10) Patent No.: US 11,970,559 B2
(45) Date of Patent: Apr. 30, 2024

(54) GRAFTED POLYLACTIC ACID

(71) Applicant: BYK-Chemie GmbH, Wesel (DE)

(72) Inventors: Inno Rapthel, Wesel (DE); Frederik Piestert, Wesel (DE); Andre Rapthel, Wesel (DE); Thorsten Kroller, Wesel (DE); Patricia Oostendorp, Wesel (DE); Lisa Bachmann, Wesel (DE)

(73) Assignee: BYK-Chemie GmbH, Wesel (DE)

( * ) Notice: Subject to any disclaimer, the term of this patent is extended or adjusted under 35 U.S.C. 154(b) by 780 days.

(21) Appl. No.: 17/258,314

(22) PCT Filed: Jul. 11, 2019

(86) PCT No.: PCT/EP2019/068656
§ 371 (c)(1),
(2) Date: Jan. 6, 2021

(87) PCT Pub. No.: WO2020/011910
PCT Pub. Date: Jan. 16, 2020

(65) Prior Publication Data
US 2021/0198407 A1    Jul. 1, 2021

(30) Foreign Application Priority Data

Jul. 13, 2018 (EP) .................................... 18183553

(51) Int. Cl.
| | | |
|---|---|---|
| *C08F 283/02* | (2006.01) | |
| *C08F 212/08* | (2006.01) | |
| *C08F 220/14* | (2006.01) | |
| *C08F 220/18* | (2006.01) | |
| *C08F 220/32* | (2006.01) | |
| *C08G 63/91* | (2006.01) | |
| *C08L 51/08* | (2006.01) | |
| *C08L 67/04* | (2006.01) | |

(52) U.S. Cl.
CPC .......... *C08F 283/02* (2013.01); *C08F 212/08* (2013.01); *C08F 220/14* (2013.01); *C08F 220/1804* (2020.02); *C08F 220/1808* (2020.02); *C08F 220/325* (2020.02); *C08L 51/08* (2013.01); *C08L 67/04* (2013.01); *C08G 63/91* (2013.01); *C08G 63/912* (2013.01); *C08L 2203/16* (2013.01); *C08L 2203/30* (2013.01); *C08L 2205/02* (2013.01)

(58) Field of Classification Search
CPC ........ C08L 67/04; C08L 51/08; C08F 283/02; C08F 220/32; C08G 63/91; C08G 63/912
See application file for complete search history.

(56) References Cited

U.S. PATENT DOCUMENTS

| | | |
|---|---|---|
| 7,566,753 B2 | 7/2009 | Randall et al. |
| 2011/0257323 A1 | 10/2011 | Hong et al. |
| 2012/0189860 A1 | 7/2012 | Li et al. |

FOREIGN PATENT DOCUMENTS

| | | | | |
|---|---|---|---|---|
| CN | 102603994 B | * | 8/2014 | ............. B29C 47/92 |
| CN | 105440610 A | * | 3/2016 | |
| WO | 2006002372 A2 | | 1/2006 | |
| WO | 2014067923 A1 | | 5/2014 | |

OTHER PUBLICATIONS

Machine translation of CN-102603994-B from IP.com (Year: 2014).*
Machine translation of CN-105440610-A from IP.com (Year: 2016).*
J. Liu, et al., "Long chain branching polylactide: Structures and Properties," Polymer, 51 (2010) pp. 5186-5197.
International Search Report and Written Opinion for International Application No. PCT/EP2019/068656, mailed Sep. 6, 2019 (13 pages).
R. Al-Itry, et al., "Improvement of thermal stability, rheological and mechanical properties of PLA, PBAT and their blends by reactive extrusion with functionalized epoxy" Polymer Degradation and Stability 97 (2012) pp. 1898-1914.

* cited by examiner

*Primary Examiner* — Kregg T Brooks
*Assistant Examiner* — David R. Foss
(74) *Attorney, Agent, or Firm* — Fitch, Even, Tabin & Flannery LLP

(57) ABSTRACT

A grafted polylactic acid is provided, wherein the grafted polylactic acid contains carboxylic acid end groups in an amount from 1.0 to 10.0 mg KOH/g and contains epoxide groups in an amount from 0.005 to 0.500 mmol/g.

21 Claims, No Drawings

GRAFTED POLYLACTIC ACID

FIELD OF THE INVENTION

The invention relates to a grafted polylactic acid. The invention relates to a blend of a grafted polylactic acid according to the present invention and another polylactic acid, which contains carboxylic acid end groups. The invention further relates to a method for processing a polylactic acid blend using the grafted polylactic acid according to the present invention. The invention further relates to a branched polylactic acid product obtainable by the method according to the present invention. The invention further relates to a method for preparing a grafted polylactic acid according to the present invention.

BACKGROUND OF THE INVENTION

Polymers, which are based on renewable raw materials, are modified to increase their applicability to more applications areas. Polylactic acid is known as a renewable polymer, which can be used nowadays in many application areas. However, one of the disadvantages of polylactic acid is a limited melt strength of the polylactic acid raw material based on a linear structure of the raw material. A polylactic acid composition having a higher melt strength is desired for many applications of the polylactic acid, such as for preparing a polylactic acid film, e.g. blown films and cast films, and for preparing foamed products containing polylactic acid.

U.S. Pat. No. 7,566,753 describes a method for preparing a branched polylactic acid by reacting a polylactic acid with an epoxy-functional acrylate polymer to introduce long-chain branching into the polylactic acid polymer. The epoxy-functional acrylate polymer contains on average from 2 to 15 free epoxide groups per molecule. In the preparation method the epoxy-functional acrylate polymer is coupled to the polylactic acid by reaction of epoxide groups of the epoxy-functional acrylate polymer with carboxyl acid end groups of the polylactic acid.

The resulting branched polylactic acid contains free epoxide groups.

In Polymer Degradation and Stability 97 (2012) 1898-1914 is described an improvement of thermal stability, rheological and mechanical properties of PLA, PBAT and their blends by reactive extrusion with an epoxy-functional acrylate polymer. In particular examples, the reactive extrusion of polylactic acid was performed with a styrene-acrylic copolymer, which is commercially available under the trade name Joncryl, which is described as chain extender/branching agent, and which contains glycidyl methacrylate monomers.

A polylactic acid containing film is prepared by melt processing a mixture of a polylactic acid, which contains carboxylic acid end groups, and said epoxy-functional acrylate polymer. The amount of said epoxy-functional acrylate polymer in the mixture is at most 1% by weight, wherein the % by weight is calculated on the total weight of the mixture.

The disadvantage of the use of said epoxy-functional acrylate polymer to modify the polylactic acid is that a melt processing for forming the branched polylactic acid is relatively slow due to a limited reactivity of the epoxide groups of the epoxy-functional acrylate polymer. Moreover, a formed product containing the branched polylactic acid may still contain glycidylmethacrylate monomers, which are typically present in a compound of the acrylate polymers, as these glycidylmethacrylate monomers are not fully converted during the melt processing step.

There is an ongoing need for polylactic acid polymers that alleviate the above-mentioned problems. Particular embodiments of the present invention aim at providing a modified polylactic acid, which enhances melt strength of a polylactic acid blend, which is processed in a melt processing step. Particular embodiments of the present invention aim at providing a modified polylactic acid, which shortens a melt processing time for enhancing melt strength of a polylactic acid blend. Particular embodiments of the present invention aim at providing a modified polylactic acid, which provides an enhanced reactivity of epoxide groups towards another polylactic acid in a melt processing step of a polylactic acid blend. Particular embodiments of the present invention aim at providing a method for preparing a modified polylactic acid, which provides an increased amount of epoxide groups per molecule of modified polylactic acid.

SUMMARY OF THE INVENTION

The invention provides a grafted polylactic acid, wherein the grafted polylactic acid contains carboxylic acid end groups in an amount from 1.0 to 10.0 mg KOH/g and contains epoxide groups in an amount from 0.005 to 0.500 mmol/g.

The grafted polylactic acid contains carboxylic acid end groups in an amount from 1.0 to 10.0 mg KOH/g. Thus, at least a portion of the end groups of the grafted polylactic acid is a carboxylic acid group. Additionally, the grafted polylactic acid contains epoxide groups in an amount from 0.005 to 0.500 mmol/g. The grafted polylactic acid having a combination of carboxylic acid end groups and epoxide groups provides enhanced melt strength of a polylactic acid blend, which is processed in a melt processing step. The polylactic acid blend comprises the grafted polylactic acid according to the present invention and another polylactic acid, which contains carboxylic acid end groups.

Additionally or alternatively, the grafted polylactic acid according to the present invention shortens a melt processing time for enhancing melt strength of a polylactic acid blend. In particular, the grafted polylactic acid according to the present invention provides an enhanced reactivity of epoxide groups towards another polylactic acid molecule in a melt processing step. In this way, the melt processing time for enhancing melt strength of a polylactic acid blend is shortened.

Preferably, the grafted polylactic acid has a catenated structure having two end groups. The catenated structure of the grafted polylactic acid has one polylactid acid chain. Alternatively, the grafted polylactic acid has a branched structure, which has three or more end groups. The branched structure of the grafted polylactic acid has at least two polylactid acid chains, which are bonded to one another.

The advantages of the invention become particularly apparent when polylactic acid having a high amount of carboxylic acid end groups is employed. Therefore, it is preferred that the amount of carboxylic acid end groups of the grafted polylactic acid is from 1.5 to 5.0 mg KOH/g, preferably from 1.5 to 3.5 mg KOH/g. The acid value is suitably determined by well-known titration methods, in particular according to DIN EN ISO 2114.

In exemplary embodiments, at least 30 mol-% of the end groups, preferably at least 50 mol-% of the end groups, more preferably at least 60 mol-% of the end groups, of the grafted polylactic acid are carboxylic acid groups. In an exemplary embodiment, in case the grafted polylactic acid has two end groups, at least one of the two end groups is a carboxylic acid group. In an exemplary embodiment, in case the grafted polylactic acid has three end groups, at least one of the three end groups, preferably at least two of the three end groups, is a carboxylic acid group.

The advantages of the invention become particularly apparent when polylactic acid having a high amount of epoxide groups is employed. Therefore, it is preferred that the grafted polylactic acid contains epoxide groups in an amount from 0.05 to 0.50 mmol/g. More preferably, the grafted polylactic acid contains epoxide groups in an amount from 0.10 to 0.40 mmol/g. Below a lower limit of the amount of epoxide groups the enhancement of the melt strength may become too little and/or a melt processing time may become too long for increasing the melt strength. In particular, an ability of the grafted polylactic acid for forming a branched polylactic acid may be insufficient below the lower limit of the epoxide groups. Above the higher limit of the amount of epoxide groups a branching of a melt processed polylactic acid may become too high or the amount of residual epoxide groups of the melt processed grafted polylactic acid, when melt processed in a blend with another polylactic acid, may remain too high. The epoxide group content is suitably determined by well-known titration methods, in particular according to ASTM D1652.

In exemplary embodiments, the grafted polylactic acid contains on average from 5 to 100 epoxide groups per molecule, preferably on average from 15 to 70 epoxide groups per molecule.

The advantages of the invention become particularly apparent when polylactic acid having a more uniform distribution of epoxide groups along the molecule is employed. In an exemplary embodiment, at least a portion of the epoxide groups is bonded onto a polymer backbone of the grafted polylactic acid. Therefore, it is preferred that the epoxide groups, optional including the at least one ethylenically unsaturated polymerizable monomer without an epoxide group, are grafted onto a polymer backbone of the grafted polylactic acid. In this way, a higher density of epoxide groups and/or a more uniform distribution along the polymer backbone of the grafted polylactic acid may be obtained. Moreover, a reactivity of the epoxide groups in a melt processing step of a polylactic acid blend (i.e. reactivity towards carboxylic acid groups of another polylactic acid) is enhanced.

Additionally, the advantages of the invention become particularly apparent when grafted polylactic acid having a high molecular weight is employed. In particular, a melt strength of a melt processed polylactic acid blend is enhanced by a high molecular weight of the grafted polylactic acid.

The grafted polylactic acid preferably has a number average molecular weight of from 10,000, preferably from 30,000, more preferably from 40,000 to 500,000, preferably to 300,000, more preferably to 250,000, as measured by GPC technique. For the GPC technique, THF is used as eluent, wherein the number average molecular weight is determined relative to polystyrene standards.

There are no particular limitations with respect to the selection of the grafted polylactic acid. The grafted polylactic acid may be crystalline or partly crystalline, L or D or mixtures thereof, capped or uncapped or a blend.

For the purpose of this invention, the terms "polylactic acid", "PLA" and "lactide" are used to denote polymers having repeating units of the structure —OC(O)CH(CH$_3$)—, irrespective of how those repeated units are formed into the polymer. The PLA preferably contains at least 50%, such as at least 80%, at least 90%, at least 95% or at least 98% by weight of those repeating units.

A preferred PLA is a polymer or copolymer of lactic acid. Certain hydroxy acids, particularly α-hydroxy acids such as lactic acid, exist in two optical enantiomers, which are generally referred to as the "D" and "L" enantiomers. Either D- or L-lactic acid can be produced in synthetic processes, whereas fermentation processes usually (but not always) tend to favor production of the L enantiomer. Lactide similarly exists in a variety of enantiomeric forms, i.e., "L-lactide", which is a dimer of two L-lactic acid molecules, "D-lactide", which is a dimer of two D-lactic acid molecules and "meso-lactide", which is a dimer formed from one L-lactic acid molecule and one D-lactic acid molecule. In addition, 50/50 mixtures of L-lactide and D-lactide that have a melting temperature of about 126° C. are often referred to as "D,L-lactide". Polymers of any of these forms of lactide, or mixtures thereof, are useful in this invention. Increased optical purity (i.e., higher concentrations of the predominant enantiomer, which may be either the D- or L-enantiomer) tends to cause the resulting polymer to be more crystalline. When a semi-crystalline polymer is desired, it is preferred that the polymer contains either L- or D-lactic acid enantiomeric units alone or else contains a mixture of both L- and D-lactic acid units in which one of the enantiomers (either L- or D-) constitutes at most about 5 mole %, preferably up to about 3 mole %, more preferably up to about 2 mole %, and especially up to about 1.6 mole percent of the polymerized repeating units. Particularly preferred semi-crystalline copolymers contain from 98.4 to 100% L isomer and from 0 to 1.6% D enantiomer (based on total moles of lactic acid repeating units). When more amorphous polymers are desired, the ratio of predominant to other enantiomeric repeating units in the copolymer is suitably from about 80:20 to about 98:2, preferably from 88:12 to 98:2, especially from about 90 to about 98% L-enantiomers and corresponding from about 10 to about 2% D enantiomers (based on total moles of lactic acid enantiomeric repeating units). Generally, the selection of enantiomer ratios will depend on the particular application and/or desired copolymer properties. In general, the higher the crystallinity, the higher are the thermal performance, dimensional stability and the modulus of the copolymer In exemplary embodiments, the grafted polylactic acid is grafted by a mixture of monomers comprising at least one epoxide-functional ethylenically unsaturated polymerizable monomer and at least one ethylenically unsaturated polymerizable comonomer without an epoxide group.

The at least one epoxide-functional ethylenically unsaturated polymerizable monomer, which comprises an epoxide group, provides that the monomer including the epoxide group is grafted onto a polymer backbone of the polylactic acid. By grafting a monomer onto a polymer backbone of the polylactic acid is meant that the monomer, with or without the epoxide group, is covalently bonded, directly or indirectly via another monomer, to the polymer backbone of lactic acid repeating units, i.e. between end groups of the polylactic acid chain. In this way, a higher amount of epoxide groups per grafted polylactic acid molecule may be obtained. In addition, by grafting a more uniform distribution of the epoxide groups along the polymer backbone of the polylactic acid may be obtained. A more uniform distribution of the epoxide groups along the polymer backbone enhances a reactivity of the epoxide groups during melt processing of the grafted polylactic acid.

Likewise, the at least one ethylenically unsaturated polymerizable comonomer without an epoxide group is grafted onto the polymer backbone of the polylactic acid. The monomer containing the epoxide group and the comonomer are provided as a mixture of monomers for grafting onto the polymer backbone of the polylactic acid.

A comonomer without an epoxide group may be suitably selected for enhancing the amount of epoxide-functional monomer grafted onto the polymer backbone of the polylactic acid. The comonomer may enhance the grafting reaction time and grafting level of the epoxide-functional monomer. A recognized reaction mechanism is a copolymerization reaction step of the epoxide-functional monomer with the comonomer during the grafting process. The comonomer may provide a link between the epoxide-functional monomer and the polymer backbone of the polylactic acid.

In exemplary embodiments, the at least one ethylenically unsaturated polymerizable comonomer without an epoxide group is selected from the group consisting of styrene, alkyl ester of acrylate, such as butylacrylate and 2-ethylhexylacrylate, and alkyl ester of methacrylic acid, such as methyl methacrylate.

In exemplary embodiments, the at least one epoxide-functional ethylenically unsaturated polymerizable monomer is selected from the group consisting of glycidylacrylate, glycidylmethacrylate, allyl glycidyl ether, 3,4-epoxy-1-butene and 1,2-epoxy-hexene. In exemplary embodiments, the mole ratio of the at least one epoxide-functional ethylenically unsaturated polymerizable monomer with respect to the at least one ethylenically unsaturated polymerizable comonomer without an epoxide group is from 5:1 to 1:1. The advantages of the invention become particularly apparent when polylactic acid having a high amount of epoxide groups is employed. The preferred range of the mole ratio from 5:1 to 1:1 enhances the amount of epoxide-functional monomer which is grafted onto the polymer backbone of the polylactic acid. As such, the amount of epoxide groups per grafted polylactic acid molecule is increased.

In a second aspect of the present invention, a blend is provided of a grafted polylactic acid according any one of the preceding claims and another polylactic acid, which contains carboxylic acid end groups.

Said other polylactic acid, which contains carboxylic acid end groups, is preferably a polylactic acid without epoxide groups. Additionally, the advantages of the invention become particularly apparent when a polylactic acid having carboxylic acid end groups and having a high molecular weight is employed in the blend. Therefore, it is preferred that the melt flow index of the other polylactic acid is from 5 to 30 g/10 minute at 210° C./2.16 kg. More preferably, the melt flow index of the other polylactic acid is from 5 to 20 g/10 minute at 210° C./2.16 kg.

The other polylactic acid preferably has a number average molecular weight of from 10,000, preferably from 30,000, more preferably from 40,000 to 500,000, preferably to 300,000, more preferably to 250,000, as measured by the GPC technique described below.

Preferably, the blend is a dry blend of the grafted polylactic acid and said another polylactic acid. In an exemplary embodiment, the grafted polylactic acid is provided in an amount of 1 to 20% by weight, preferably in an amount of 3 to 15% by weight, wherein the % by weight is calculated on the total weight of the blend.

In an exemplary embodiment, said other polylactic acid is provided in an amount of 80% to 99% by weight, preferably in an amount of 85 to 97% by weight, wherein the % by weight is calculated on the total weight of the blend.

The blend may be processed in a melt of the blend using a method according to the present invention in order to obtain a polylactic acid product, which contains an amount of branched polylactic acid.

In another aspect of the present invention, a method is provided for processing a polylactic acid blend comprising the steps of:
a. providing:
  i. polylactic acid, which contains carboxylic acid end groups, and
  ii. a grafted polylactic acid according to the present invention;
b. mixing the provided components; and
c. melt processing of the mixture of the polylactic acid and the grafted polylactic acid.

In this way, a polylactic acid product is obtainable by the method for processing a polylactic acid blend, wherein the polylactic acid product contains an amount of branched polylactic acid.

The polylactic acid i., which contains carboxylic acid end groups, is preferably a polylactic acid without epoxide groups. The grafted polylactic acid ii. may be any one according to the present invention. In step b. the components i. and ii. are mixed. In step c. the mixture of the components i. and ii. is melt processed. Said step c. may typically comprise heating the components i. and ii. to form a melt of the mixture. In an embodiment, the step b. and c. may at least partially overlap one another. In a particular embodiment, step b. is performed to form a blend of the polylactic acid i. and the grafted polylactic acid ii. before heating the components i. and ii. for melt processing the mixture in step c. In an example, the mixing step b. may be performed at room temperature.

Preferably the steps b. and c. are performed using an extruder. The mixing step of the components and the melt processing step of the mixture including the heating step may be suitably controlled by controlling the zones of the extruder.

Additionally, the advantages of the invention become particularly apparent when a reasonable high amount of grafted polylactic acid according to the present invention is employed in the mixture formed in step b. Surprisingly, the melt processing of the grafted polylactic acid ii. according to the present invention in the blend or mixture of component i. and ii. is effective for reacting the epoxide groups of the grafted polylactic acid ii. with the carboxylic acid end groups of the polylactic acid i. In this way, a polylactic acid product is obtainable by the melt processing step of the mixture, wherein the polylactic acid product contains an amount of branched polylactic acid.

In an exemplary embodiment, the grafted polylactic acid is provided in the mixture in an amount of 1 to 20% by weight, preferably in an amount of 3 to 15% by weight, wherein the % by weight is calculated on the total weight of the components i. and ii. When a relatively high amount of grafted polylactic acid ii. is provided in step a. of at least 1% by weight, preferably at least 3% by weight, the melt processing time of step c. may suitably be shortened while obtaining a sufficient melt strength. In fact, the melt strength is enhanced by increasing the amount of branched polylactic acid formed in the blend during the melt processing step c.

In an exemplary embodiment, said other polylactic acid is provided in the mixture in an amount of 80% to 99% by weight, preferably in an amount of 85 to 97% by weight, wherein the % by weight is calculated on the total weight of the components i. and ii.

In exemplary embodiment, additional additives may be provided in step a., which are mixed in step b. together with components i. and ii. and melt processed in step c. Said additional additives may include at least one of an antioxidant, a preservative, a catalyst deactivator, a thermal stabilizer, a UV stabilizer, a plasticizer, a lubricant, a filler, a nucleating agent, a colorant, a blowing agent or a mixture thereof.

In an exemplary embodiment, the melt processing in step c. is performed from 30 seconds to 120 seconds, preferably from 30 seconds to 60 seconds, at a temperature between 150° C. and 250° C. As, the melt processing time is shortened to less than 120 seconds, preferably less than 60 seconds, a single passage through an extruder may be used to obtain a polylactic acid blend having a sufficient melt strength for forming a film.

Additionally, the advantages of the invention become particularly apparent when a reasonable dry grafted polylactic acid according to the present invention is employed in the mixture formed in step b. Therefore, it is preferred that the step a. of providing the grafted polylactic acid ii. comprises a step of drying the grafted polylactic acid ii. before the mixing step b. In an example, the grafted polylactic acid ii. is dried during about 3 hours to 4 hours at a temperature of 80° C. using a relative dry environment before the mixing step b.

In an exemplary embodiment, the melt processing comprises forming a film that comprises the melt processed mixture of the polylactic acid and the grafted polylactic acid. Additionally, the advantages of the invention become particularly apparent when the melt processed mixture of the polylactic acid and the grafted polylactic acid comprises a high amount of branched polylactic acid.

In another aspect of the present invention, a polylactic acid product is provided obtainable by the method according to the present invention, wherein the polylactic acid product comprises an amount of branched polylactic acid. The melt strength of the polylactic acid product is enhanced by the branched polylactic acid in the polylactic acid product. Additionally, the advantages of the invention become particularly apparent when a higher amount of branched polylactic acid is present in the polylactic acid product.

In another aspect of the present invention, a method is provided for preparing a grafted polylactic acid, the method comprising the steps of:
a. providing
  i. a polylactic acid containing carboxylic acid end groups, preferably in the form of a powder of the polylactic acid,
  ii. an epoxide-functional ethylenically unsaturated polymerizable monomer, and
  iii. a radical generating agent;
b. mixing the provided components,
c. processing the mixture of components I, ii and iii. at a temperature between 80° C. and 160° C.

Said component i. is a polylactic acid containing carboxylic acid end groups. There are no particular limitations with respect to the selection of the polylactic acid for grafting. The polylactic acid may be crystalline or partly crystalline, L or D or mixtures thereof, capped or uncapped or a blend.

The polylactic acid for grafting is preferably provided as a powder. The powder of the polylactic acid supports a uniform grafting of the polylactic acid molecules and/or enhances a level of grafting of the polylactic acid during processing step c.

In a preferred embodiment, the grafted polylactic acid prepared by the method is a grafted polylactic acid according to the present invention. By suitably selecting the temperature of the processing step c. in the range between 80° C. and 160° C. the grafted polylactic acid according to embodiments of the present invention is obtained.

A melt flow rate of the polylactic acid is an indication of molecular weight of the polylactic acid and can vary, depending on the requirements. In a preferred embodiment, the polylactic acid used for grafting has a melt flow rate in the range of 1 to 200 g/10 min at 210° C./2.16 kg. More preferably the polylactic acid used for grafting has a melt flow rate in the range of 1 to 50 g/10 min at 210° C./2.16 kg. Even more preferably the polylactic acid used for grafting has a melt flow rate in the range of 5 to 30 g/10 min at 210° C./2.16 kg.

The advantages of the invention become particularly apparent when polylactic acid having a high molecular weight is employed. Therefore, it is preferred that the melt flow index of the polylactic acid, which is provided for grafting, is from 5 to 20 g/10 minute at 210° C./2.16 kg.

Said component ii. is an epoxide-functional ethylenically unsaturated polymerizable monomer. The component ii. is grafted onto a polymer backbone of the polylactic acid for i. during processing step c. In exemplary embodiments, component ii. is selected from the groups consisting of glycidylacrylate, glycidylmethacrylate, allyl glycidyl ether, 3,4-epoxy-1-butene and 1,2-epoxy-hexene.

The processing step c. for grafting component i. is suitably carried out in the presence of the radical generating agents iii., such as organic peroxides and azo compounds. Radical generating agents having a one hour half-life temperature ($T_{H/1\ h}$) in the range of 55 to 150° C. are preferred. Suitable examples are dialkyl peroxidicarbonates, such as dibutyl peroxidicarbonate and dicetylperoxidicarbonate ($T_{H/1\ h}$=65° C.); dilaurylperoxide ($T_{H/1\ h}$=80° C.); dibenzoylperoxide ($T_{H/1\ h}$=91° C.); tert-butylperoxy2-ethyl hexanoate ($T_{H/1\ h}$=91° C.); tert-butylperoxy-isobutyrate ($T_{H/1\ h}$=98° C.); 1,1-di(tert-butylperoxy)-cyclohexane ($T_{H/1\ h}$=113° C.), tert-butylperbenzoate ($T_{H/1\ h}$=122° C.); dicumylperoxide ($T_{H/1\ h}$=132° C.); 2,5-dimethyl-2,5-di(tert-butylperoxy)-hexane ($T_{H/1\ h}$=134° C.); 2,5-dimethyl-2,5-di(tert-butylperoxy)hexin-(3) ($T_{H/1\ h}$=141° C.); and di-tert-butylperoxide ($T_{H/1\ h}$=141° C.).

The grafting step for grafting component i. is preferably carried out in the solid phase below the softening or melting temperature of the polylactic acid. An advantage of the solid phase reaction is the possibility to achieve a very low content of residual monomers, for example 0.01% by weight or less of residual monomer, calculated on the weight of the grafted polylactic acid.

Additionally, the advantages of the invention become particularly apparent when the processing step c. is carried in the solid phase below the softening or melting temperature of the polylactic acid. Therefore, the processing step c. is carried out at a temperature between 80° C. and 160° C., preferably at a temperature between 80° C. and 125° C., more preferably at a temperature between 80° C. and 110° C. A person skilled in the art of polylactic acid may suitable select a higher limit of the temperature range for the processing step c. based on a determined softening or melting temperature of the polylactic acid.

Additionally, the advantages of the invention become particularly apparent when the processing step c. is carried out for a sufficiently long processing time to obtain a desired amount of epoxide groups, which are bonded to the polylactic acid. The processing time of step c., which is defined as the time within the temperature range as defined, may be from 10 minutes to 300 minutes, preferably from 20 minutes to 240 minutes, more preferably from 30 minutes to 180 minutes.

In a further exemplary embodiment, in step a. additionally is provided iv. at least one ethylenically unsaturated polymerizable monomer without an epoxide group, which is mixed in step b. and processed in step c. together with component i., ii and iii. In this way, the polylactic acid of component i. is grafted by a mixture of component ii. and component iv. during the processing step c. In particular, the at least one ethylenically unsaturated polymerizable comonomer without an epoxide-functional group iv. may be selected for enhancing a grafting of the component ii. onto a polymer backbone of the polylactic acid of component i.

In particular embodiments, said at least one one ethylenically unsaturated polymerizable monomer without an epoxide group is selected from the group consisting of styrene, alkyl ester of acrylate, such as butylacrylate and 2-ethylhexylacrylate, and alkyl ester of methacrylic acid, such as methyl methacrylate.

Preferably, said at least one ethylenically unsaturated polymerizable comonomer is selected from the group consisting of styrene, a $C_1$-$C_{12}$-alkyl ester of acrylic acid, such as methyl acrylate, ethyl acrylate and butyl acrylate, a $C_1$-$C_{12}$-alkyl ester of methacrylic acid, such as methyl methacrylate, and combinations thereof.

In exemplary embodiments, in step a. the mole ratio of the epoxide-functional ethylenically unsaturated polymerizable monomer (i.e. component ii.) with respect to the at least one ethylenically unsaturated polymerizable monomer without an epoxide group (i.e. component iv.) is from 5:1 to 1:1.

Measurement of Melt Flow Rate Index

The measurement of the melt flow rate index is performed according to ISO 1133 for 10 min at 210° C./2.16 kg.

Die Swell

During the extrusion of the polymer melt through a die restriction the polymer melt is deformed by the die. Due to the viscoelastic properties of the polymer melt a part of the deformation is reversible. The retardation of the polymer molecules, which are oriented due to the passing through the die restriction, is described as entropic elasticity. The extruded polymer melt obtains a cross section diameter d, outside the die, which cross section diameter is enlarged due to this effect compared to the cross section diameter do of the restriction of the die. See for further description of the determination of die swell behavior of a polymer melt the thesis of Armin Merten: "Untersuchungen zu FlieBinstabilitsten bei der Extrusion von Polymeren mit der Laser-Doppler Anemometrie", Universitst Erlangen Nürnberg, 2005.

As the amount of die swell is a.o. dependent on the branching and on the molecular weight of the polymer, a determination of die swell during a measurement of melt flow rate index according to ISO 1133 is an easy way to combine the determination of both properties at the same time.

The measurements were performed by the following steps:
  Drying the granulate of the grafted polylactic acid during 4 hours at 80° C.;
  Determining the melt flow rate for 10 min at 210° C./2.16 kg;
  During the melt flow rate measurement cut of 2 cm long strands of the polymer melt;
  Allowing the polymer strands to cool to room temperature;
  Measuring a cross section diameter D of the polymer strands (D unrelaxed);
  Tempering the polymer strands during 15 minutes in a warm silicon oil bath (at temperature T);
  Cleaning the polymer strands with ethanol, and
  Determining a cross section diameter D of the polymer strands (D relaxed).

The strand widening is calculated according to:

$$SA(\text{unrelaxed}) = (D \text{ unrelaxed}/2.095) - 1$$

$$SA(\text{relaxed}) = (D \text{ relaxed}/2.095) - 1$$

wherein D unrelaxed and D relaxed are expressed in [mm].

Melt Strength

The determination of the melt strength of a polymer melt by a rheology measurement is described a.o. in Meissner, J, Dehnungsverhalten von Polyäthylen-schmelzen, Rheologica Acta, 10 (1971), 230-242.

The measurements were performed on a Rheotens 71.97 Feeder—HCV Rheograph. The following parameters of were used:

Parameter HCV:
Die: round capillary 30.0/2.0/180
Temperature: 180° C.
Soak time: 10 min
Piston speed: 0.265 mm/s
Parameter Rheotens:
Acceleration: 24 mm/s$^2$
Gap between die and wheels: 100 mm
Gap between wheels: Dial 3
Standard wheels
Samples have been dried @80° C. for 3 hours
The value of F max (in cN) is taken as measure for the melt strength of the polymer melt.

EXAMPLES

Preparation of Grafted Polylactic Acid Polymers

Example 1

A polylactic acid (PLA) is provided in powder form in a reactor. The polylactic acid has a MFR (190 C, 2.16 kg=of 4.5 g/10 minutes and a melting range of 145-160° C. (determined by DSC technique at a heating rate of 10° C./minute).

Additionally, glycidyl methacrylate (4% by weight), styrene (1% by weight) and dilauroylperoxide (DLP) (1% by weight) were added into the reactor. All the % by weight are calculated on the weight of the solid polylactic acid. Oxygen gas is removed from the reactor by leading $N_2$ gas through the reactor.

The components are mixed during 10 minutes under $N_2$ atmosphere. Thereafter, the mixture is heated to $T_R$=105° C. by applying a heating rate of 1.9 C/minute. The reaction mixture is stirred at $T_R$=105° C. during 45 minutes using a stirring rate of 800 revolutions per minute. Next, in a desorption step during 60 minutes 40 volume parts of $N_2$ gas per reactor volume unit are lead through the reaction product.

After the desorption time $t_{DES}$ of 60 minutes the reaction product is cooled to about 90° C. The reaction product is further cooled to 50° C. Then the properties of the grafted PLA are determined. The amount of monomer included into the polylactic acid by grafting is determined by gravimetric analysis.

Example 2

The same polylactic acid is used as in Example 1 for grafting. Additionally, glycidyl methacrylate (4% by weight), butylacrylate (1% by weight) and dilauroylperoxide (DLP) (1% by weight) were added into the reactor. All the % by weight are calculated on the weight of the solid polylactic acid. Oxygen gas is removed from the reactor by leading $N_2$ gas through the reactor.

The further reaction steps were performed in accordance to Example 1.

TABLE I properties of the grafted polylactic acid polymers according to the Examples

| Example | Backbone polymer | Monomer/comonomer | MVR 190° C., 21 kg | Epoxide content | Carboxylic acid content |
|---|---|---|---|---|---|
| 1 | PLA, MFR 4.5 | GMA/St | 14 cm³/ 10 min | 0.21 mmol/g | 1.4 mg KOH/g |
| 2 | PLA, MFR 4.5 | GMA/BA | 13 cm³/ 10 min | 0.22 mmol/g | 1.4 mg KOH/g |

Based on the amount of monomer expressed in % by weight, a content of epoxide groups of the grafted polylactic acid can be determined. In these examples, 3.0 wt % monomer glycidyl methacrylate equals to about 0.21 mmol/g epoxide groups in the grafted polylactic acid and 3.1 wt % monomer glycidyl methacrylate equals to about 0.22 mmol/g epoxide groups in the grafted polylactic acid.

Processing of a Polylactic Acid Blend

Examples 3-9

As indicated in Table II, in a twin screw extruder (type ZSK 25) a blend is processed of a polylactic acid, which contains carboxylic acid end groups, and an active component, which comprises epoxide groups. The Table II indicates the temperature of the subsequent temperature zones of the extruder. The active component may in examples be a grafted polylactic acid according to the present invention containing epoxide groups and carboxylic end groups. The components are introduced into a main entrance of the twin screw extruder ZSK 25 using a dosing feeder. For the melt processing of the polylactic acid blend the following extruder parameters were used:

Temperature control as shown in Table II:

TABLE II temperature control of the extruder for melt processing of the polylactic acid blend

| Temperature zone | 1 | 2 | 3 | 4 | 5 | 6 | 7 | 8 |
|---|---|---|---|---|---|---|---|---|
| Temperature [° C.] | 160 | 170 | 190 | 220 | 220 | 220 | 220 | 220 |

Revolution number=100 rpm
Throughput 7 kg/hours
Strand granulation

Table III indicates the processing results of the Examples 3-9 of the polylactic acid blend, which were processed in the extruder ZSK 25 using the parameters mentioned above. In all of these examples, Ingeo 4043 is used as polylactic acid having carboxylic acid end groups.

TABLE III melt processing results of polylactic acid blends

| Ex. | PLA [% by weight] | Active component [type] | [% by weight] | Processing time [seconds] | SA (Relaxed) [—] | F max [cN] |
|---|---|---|---|---|---|---|
| 3* | 100% | No | 0% | 180 | 0.07 | 0.5 |
| 4* | 99.5% | Joncryl 4368 | 0.5% | 180 | 1.08 | 40.6 |
| 5* | 99.5% | Joncryl 4368 | 0.5% | 45 | 0.52 | 12.7 |
| 6 | 90% | Example 1 | 5% | 45 | 0.55 | 14.0 |
| 7 | 90% | Example 1 | 10% | 45 | 1.15 | 48.6 |
| 8 | 90% | Example 2 | 5% | 45 | 0.7 | 22.0 |
| 9 | 90% | Example 2 | 10% | 45 | 1.18 | 50.3 |

The examples marked with „*" are comparison examples.

The Ingeo 4043 used has an amount of 1-2 mmol/g carboxylic acid end groups. The strand widening SA (relaxed) is measured of the resulting strand formed at the outlet of the extruder. The melt strength F max is measured according to the method described above. Each of the strand widening SA (relaxed) and the amount as indicated by F max may be used to indicate the melt strength of the polylactic acid product formed from the melt processing step. Example 3 is a comparative example of melt processing 100% PLA without any active component having epoxide groups. Both the SA (relaxed=and the F max are very low. Example 4 and 5 are comparative examples of melt processing of a blend of PLA with Joncryl 4368 as an active component. Joncryl 4368 is a styrene-acrylic copolymer, which contains a styrene monomer and a glycidyl methacrylate monomer which are incorporated into the copolymer. The amount of Joncryl 4368 used in the blend (0.5 wt %) is known as a preferred amount for melt processing together with a polyacrylic acid (see e.g. U.S. Pat. No. 7,566,753). It is determined, that when the amount of Joncryl 4368 is increased above one equivalent of epoxide group per mole of PLA resin, the branched polylactic acid may contain a too high amount of free glycidylmethacrylate monomers. A higher amount of acrylate monomers in the polylactic acid product is not desirable because of safety issues. Moreover, it is known from the prior art, see e.g. U.S. Pat. No. 7,566,753, that an amount of acrylate polymer, such as Joncryl 4368, higher than 0.5 mole/mole of polylactic acid tends not to increase a branching degree of the polylactic acid product. As such, the maximum amount of Joncryl 4368 provided in the polylactic acid blend is restricted.

Example 4 and 5 show that a processing time of 45 seconds merely provides a polylactic acid blend having a slightly increased melt strength (Fmax of 12.7 cN). The processing time needs to be increased to 180 seconds to obtain a melt strength of 40.6 cN.

Example 6 and 7 are based on a blend of PLA and a grafted polylactic acid according to example 1. Example 6 shows that by using 5 wt % of grafted polylactic acid according to example 1 the melt strength is increased to 14.0 cN using the processing time of 45 seconds. Example 7 shows that the melt strength can be further increased at the processing time of 45 seconds by using a larger amount of grafted polylactic acid (10 wt % instead of 5 wt %). Example 8 and 9 are based on a blend of PLA and a grafted polylactic acid according to example 2. Example 8 shows that by using 5 wt % of grafted polylactic acid according to example 1 the melt strength is further increased to 22.0 cN (compared to Example 6) using the processing time of 45 seconds. Example 9 shows that the melt strength can be further increased at the processing time of 45 seconds by using a larger amount of grafted polylactic acid (10 wt % instead of 5 wt %).

The invention claimed is:

1. A grafted polylactic acid, wherein the grafted polylactic acid contains carboxylic acid end groups in an amount from 1.0 to 10.0 mg KOH/g and contains epoxide groups in an amount from 0.005 to 0.500 mmol/g.

2. The grafted polylactic acid according to claim 1, wherein the grafted polylactic acid is grafted by a mixture of monomers comprising at least one epoxide-functional ethylenically unsaturated polymerizable monomer and at least one ethylenically unsaturated polymerizable comonomer without an epoxide group.

3. The grafted polylactic acid according to claim 2, wherein the at least one ethylenically unsaturated polymerizable comonomer without an epoxide group comprises one or more of styrene, an alkyl ester of acrylate, and an alkyl ester of methacrylic acid.

4. The grafted polylactic acid according to claim 2, wherein the at least one epoxide-functional ethylenically unsaturated polymerizable monomer and the at least one ethylenically unsaturated polymerizable comonomer without an epoxide group are grafted onto a polymer backbone of the grafted polylactic acid.

5. The grafted polylactic acid according to claim 2, wherein the mole ratio of the at least one epoxide-functional ethylenically unsaturated polymerizable monomer with respect to the at least one ethylenically unsaturated polymerizable comonomer without an epoxide group is from 5:1 to 1:1.

6. The grafted polylactic acid according to claim 1, wherein the grafted polylactic acid comprises a plurality of acrylate segments bonded to a polymer backbone of the grafted polylactic acid, each acrylate segment comprising at least one epoxide-functional acrylate repeating unit and optionally including an acrylate repeating unit without an epoxide group.

7. The grafted polylactic acid according to claim 1, wherein the amount of carboxylic acid end groups is from 1.5 to 5.0 mg KOH/g.

8. The grafted polylactic acid according to claim 1, wherein the grafted polylactic acid contains on average from 5 to 100 epoxide groups per molecule.

9. The grafted polylactic acid according to claim 1, wherein at least 30 mol-% of end groups of the grafted polylactic acid are the carboxylic acid end groups.

10. A blend comprising the grafted polylactic acid according to claim 1 and another polylactic acid containing carboxylic acid end groups.

11. A method for processing a polylactic acid blend comprising:
providing:
a polylactic acid containing carboxylic acid end groups, and
a grafted polylactic acid according to claim 1;
mixing the polylactic acid and the grafted polylactic acid; and
melt processing the mixture of the polylactic acid and the grafted polylactic acid.

12. The method according to claim 11, wherein the grafted polylactic acid is provided in an amount of 1 to 20% by weight calculated on the total weight of the polylactic acid and the grafted polylactic acid.

13. The method according to claim 11, wherein the melt processing is performed from 30 seconds to 120 seconds at a temperature between 150° C. and 250° C.

14. The method according to claim 11, wherein the melt processing comprises forming a film comprising the melt processed mixture of the polylactic acid and the grafted polylactic acid.

15. A polylactic acid product obtained by the method according to claim 11, wherein the polylactic acid product comprises an amount of a branched polylactic acid.

16. The polylactic acid product according to claim 15 having the shape of a film.

17. A method for preparing a grafted polylactic acid, comprising:
providing
a polylactic acid containing carboxylic acid end groups,
an epoxide-functional ethylenically unsaturated polymerizable monomer, and
a radical generating agent;
mixing the polylactic acid, the epoxide-functional ethylenically unsaturated polymerizable monomer, and the radical generating agent,
processing the mixture of the polylactic acid, the epoxide-functional ethylenically unsaturated polymerizable monomer, and the radical generating agent at a temperature between 80° C. and 160° C. to yield a grafted polylactic acid containing carboxylic acid end groups in an amount from 1.0 to 10.0 mg KOH/g and epoxide groups in an amount from 0.005 to 0.500 mmol/g.

18. The method according to claim 17, further comprising mixing at least one ethylenically unsaturated polymerizable monomer without an epoxide group with the polylactic acid, the epoxide-functional ethylenically unsaturated polymerizable monomer, and the radical generating agent, wherein the at least one ethylenically unsaturated polymerizable monomer without an epoxide group comprises one or more of styrene, an alkyl ester of acrylic acid, and an alkyl ester of methacrylic acid.

19. The method according to claim 18, wherein the mole ratio of the epoxide-functional ethylenically unsaturated polymerizable monomer with respect to the at least one ethylenically unsaturated polymerizable monomer without an epoxide group is from 5:1 to 1:1.

20. The method according to claim 18, wherein the at least one ethylenically unsaturated polymerizable monomer without an epoxide group comprises one or more of butylacrylate, 2-ethylhexylacrylate, and methyl methacrylate.

21. The method according to claim 17, wherein the epoxide-functional ethylenically unsaturated polymerizable monomer comprises one or more of glycidylacrylate, glycidylmethacrylate, allyl glycidyl ether, 3,4-epoxy-1-butene and 1,2-epoxy-hexene.

* * * * *